(12) United States Patent
Matsumoto

(10) Patent No.: US 11,435,327 B2
(45) Date of Patent: Sep. 6, 2022

(54) SUPERCRITICAL FLUID CHROMATOGRAPH AND SUPERCRITICAL FLUID CHROMATOGRAPHY ANALYSIS METHOD

(71) Applicant: SHIMADZU CORPORATION, Kyoto (JP)

(72) Inventor: Keiko Matsumoto, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 93 days.

(21) Appl. No.: 16/753,011

(22) PCT Filed: Sep. 10, 2018

(86) PCT No.: PCT/JP2018/033349
§ 371 (c)(1),
(2) Date: Apr. 2, 2020

(87) PCT Pub. No.: WO2019/069625
PCT Pub. Date: Apr. 11, 2019

(65) Prior Publication Data
US 2020/0232952 A1 Jul. 23, 2020

(30) Foreign Application Priority Data
Oct. 5, 2017 (JP) .............................. JP2017-194830

(51) Int. Cl.
*G01N 30/38* (2006.01)
*G01N 30/32* (2006.01)

(52) U.S. Cl.
CPC ............. *G01N 30/38* (2013.01); *G01N 30/32* (2013.01)

(58) Field of Classification Search
CPC ........ G01N 30/26; G01N 30/32; G01N 30/34; G01N 30/38; G01N 30/88; B01D 15/40
See application file for complete search history.

(56) References Cited

U.S. PATENT DOCUMENTS

| 6,474,136 B1 | 11/2002 | Nishina |
| 2015/0330954 A1 | 11/2015 | Goto et al. |
| 2018/0267511 A1* | 9/2018 | Matsumoto ............ G01N 30/24 |

FOREIGN PATENT DOCUMENTS

| CN | 104813163 A | 7/2015 |
| JP | H06174707 A * | 6/1994 |

(Continued)

OTHER PUBLICATIONS

International Search Report with respect to International Patent Application No. PCT/JP2018/033349, dated Oct. 23, 2018.

(Continued)

*Primary Examiner* — Nimeshkumar D Patel
*Assistant Examiner* — Gedeon M Kidanu
(74) *Attorney, Agent, or Firm* — Renner, Otto, Boisselle & Sklar, LLP

(57) ABSTRACT

A supercritical fluid chromatograph includes an analysis flow path, a mobile phase liquid sender, a masking liquid sender, a sample injector, an analysis column and a back pressure adjustor. The mobile phase liquid sender sends a mobile phase in the analysis flow path. The masking liquid sender sends a masking liquid in the analysis flow path. The masking liquid is the liquid that causes an inner surface of a metal pipe constituting the analysis flow path to have a function of suppressing adsorption of a metal-adsorbing substance. The sample injector injects a sample into the analysis flow path. The analysis column is provided on the analysis flow path and separates the sample that is injected into the analysis flow path by the sample injector. The back pressure adjustor is provided at a downstream end of the analysis flow path and adjusts the pressure in the analysis flow path.

8 Claims, 3 Drawing Sheets

(56) References Cited

FOREIGN PATENT DOCUMENTS

| JP | 2001-124751 | A | 5/2001 | | |
|---|---|---|---|---|---|
| JP | 2011-099686 | A | 5/2011 | | |
| JP | 3211870 | U | 8/2017 | | |
| WO | 2014/083639 | A1 | 6/2014 | | |
| WO | WO-2014083639 | A1 * | 6/2014 | ............ | B01D 15/40 |
| WO | WO-2017164289 | A1 * | 9/2017 | ............ | B01J 20/261 |

OTHER PUBLICATIONS

Written Opinion of the International Searching Authority with respect to International Patent Application No. PCT/JP2018/033349, dated Oct. 23, 2018 (English Machine Translation).
Office Action for corresponding Chinese Patent Application No. 201880061498.9, dated May 9, 2022, with English language machine translation.
Li Zang et al.; "Residual metals cause variability in methionine oxidation measurements in protein pharmaceuticals using LC-UV/MS peptide mapping"; Journal of Chromatography B, 895-896; 2012; 71-76.

* cited by examiner

SUPERCRITICAL FLUID CHROMATOGRAPH AND SUPERCRITICAL FLUID CHROMATOGRAPHY ANALYSIS METHOD

TECHNICAL FIELD

The present invention relates to supercritical fluid chromatography for sending a mobile phase including carbon dioxide in an analysis flow path having an analysis column for separating a sample, adjusting the pressure in the analysis flow path to a predetermined pressure by using a back pressure adjustor and injecting the sample into the analysis flow path to carry out separation analysis of the sample.

BACKGROUND ART

Supercritical fluid chromatography using a supercritical fluid has been known as an analysis technique for carrying out separation analysis of a sample (see Patent Document 1). Supercritical fluid chromatography is the chromatography in which carbon dioxide or the like is changed into a supercritical fluid by adjustment of the temperature and pressure to certain values, and the supercritical fluid is used as a solvent. The supercritical fluid has the properties of both liquid and gas, and is characterized in having higher diffusibility and lower viscosity than liquid. It is possible to carry out analysis at high speed and with high resolution and high sensitivity by using such a supercritical fluid as a solvent.
[Patent Document 1] WO 2014-083639 A1

SUMMARY OF INVENTION

Technical Problem

In a case where an attempt to analyze a sample including a compound having a phosphate group such as phosphatidic acid by supercritical fluid chromatography is made, a peak shape of a specific component may become broad, or a specific component may not be eluted from an analysis column thereby not being detected. This is the problem caused by adsorption of a substance such as phosphatidic acid having adsorbability with respect to metal on an inner surface of a metal pipe constituting the analysis flow path.

Although such a problem does not occur if the analysis path is constituted by a non-metallic pipe, it is necessary to use a high-pressure resistant metallic pipe to constitute the analysis flow path since the pressure in the analysis flow path becomes high (10 MPa, for example) in the supercritical fluid chromatography. Therefore, the analysis flow path cannot be constituted by a non-metallic pipe such as a resin pipe. Thus, it is difficult to analyze a sample including a metal-adsorbing substance such as phosphatidic acid having adsorbability with respect to metal in the conventional supercritical fluid chromatography.

The present invention was conceived considering the aforementioned problems of conventional supercritical fluid chromatography, and an object of the present invention is to enable supercritical fluid chromatography of a metal-adsorbing substance to be carried out successfully.

Solution to Problem

The supercritical fluid chromatograph according to the present invention includes an analysis flow path, a mobile phase liquid sender, a masking liquid sender, a sample injector, an analysis column and a back pressure adjustor. The mobile phase liquid sender sends a mobile phase in the analysis flow path. The masking liquid sender sends a masking liquid in the analysis flow path. The masking liquid is the liquid that causes an inner surface of a metal pipe constituting the analysis flow path to have a function of suppressing adsorption of a metal-adsorbing substance. The sample injector injects a sample into the analysis flow path. The analysis column is provided on the analysis flow path and separates the sample that is injected into the analysis flow path by the sample injector. The back pressure adjustor is provided at a downstream end of the analysis flow path and adjusts the pressure in the analysis flow path.

That is, the supercritical fluid chromatograph according to the present invention includes a masking liquid sender for sending a masking liquid in the analysis flow path and can execute masking processing for causing the inner surface of the metal pipe constituting the analysis flow path to have a function of suppressing adsorption of a metal-adsorbing substance. As long as such masking processing is executed before analysis of the sample is started, adsorption of a metal-adsorbing substance on the inner surface of the analysis flow path is suppressed, and the metal-adsorbing substance can be analyzed successfully in an SFC.

The supercritical fluid chromatograph of the present invention is preferably configured to automatically execute the above-mentioned masking processing in a period of time in which a sample is not being analyzed. As such, the supercritical fluid chromatograph of the present invention may further include a masking-processing step executor configured to execute a masking-processing step of sending the masking liquid in the analysis flow path for a predetermined time using the masking liquid sender in a predetermined period of time in which analysis is not being carried out, and causing the inner surface of the metal pipe constituting the analysis flow path to have a function of suppressing adsorption of a metal-adsorbing substance. "In a predetermined period of time in which analysis is not being carried out" refers to the period of time scheduled in advance by a user. The user makes settings such that the above-mentioned masking-processing step is executed in the period of time between analyses in a serial analysis or during the night-time when analysis is not being carried out, for example. Thus, a metal-adsorbing substance can be analyzed highly efficiently in the SFC.

In the above-mentioned case, the supercritical fluid chromatograph preferably further includes a cleaning step executor configured to execute a cleaning step of sending liquid other than the masking liquid in the analysis flow path for a predetermined time after the masking-processing step ends, and removing the masking liquid in the analysis flow path. This causes the step of removing the masking liquid to be automatically executed after the masking-processing step ends, and enables the effect of the masking liquid on analysis to be suppressed.

A supercritical fluid chromatography analysis method according to the present invention includes sending a mobile phase including carbon dioxide in an analysis flow path having an analysis column for separating a sample, adjusting a pressure in the analysis flow path to a predetermined pressure using a back pressure adjustor and injecting the sample into the analysis flow path to carry out separation analysis of the sample.

The supercritical fluid chromatography analysis method includes a masking-processing step of sending a masking liquid for suppressing adsorption of a metal-adsorbing substance on an inner surface of a metal pipe constituting the analysis flow path in the analysis flow path for a predetermined time, and an analysis step of sending the mobile phase in the analysis flow path and injecting a sample including a metal-adsorbing substance into the analysis flow path to carry out separation analysis of the sample after the masking-processing step is completed.

The supercritical fluid chromatography analysis method according to the present invention may further include a cleaning step of sending liquid other than the masking liquid in the analysis flow path for a predetermined time after the masking-processing step is completed and before the analysis step is started, and removing the masking liquid in the analysis flow path.

Advantageous Effects of Invention

Since being able to execute the masking processing for causing the inner surface of the metal pipe constituting an analysis flow path to have a function of suppressing adsorption of a metal-adsorbing substance, the supercritical fluid chromatograph according to the present invention can suppress the adsorption of a metal-adsorbing substance on the inner surface of the analysis flow path and analyze a sample including the metal-adsorbing substance successfully.

With the supercritical fluid chromatography analysis method according to the present invention, the masking processing for causing the inner surface of the metal pipe constituting an analysis flow path to have a function of suppressing adsorption of a metal-adsorbing substance is executed before a sample including the metal-adsorbing substance is analyzed. Thus, adsorption of the metal-adsorbing substance on the inner surface of the analysis flow path is suppressed, and the metal-adsorbing substance can be analyzed successfully.

DESCRIPTION OF EMBODIMENTS

One inventive example of a supercritical fluid chromatograph and one inventive example of a supercritical fluid chromatography analysis method will be described below with reference to the drawings.

Figure 1:
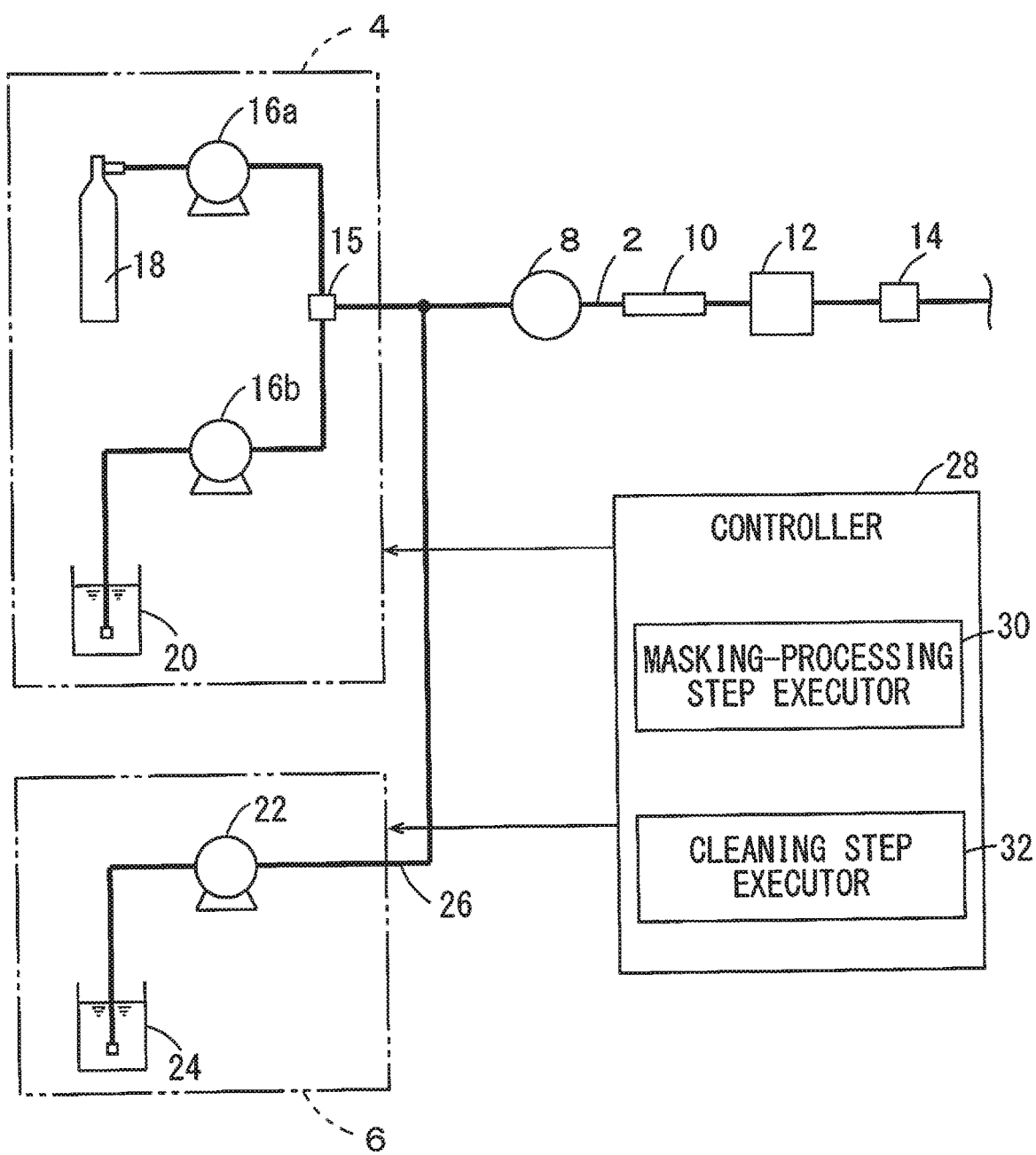
FIG. 1 is a schematic diagram showing the configuration of one inventive example of a supercritical fluid chromatograph.

FIG. 1 shows the one inventive example of the supercritical fluid chromatograph.

The supercritical fluid chromatograph of this inventive example includes an analysis flow path 2, a mobile phase liquid sender 4, a masking liquid sender 6, a sample injector 8, an analysis column 10, a detector 12, a back pressure controller 14 and a controller 28.

The mobile phase liquid sender 4 includes a pump 16a for sending carbon dioxide sealed in a carbon dioxide cylinder 18, a pump 16b for sending a modifier stored in a modifier container 20 and a mixer 15 for mixing the carbon dioxide sent by the pump 16a and the modifier sent by the pump 16b. When a sample is analyzed, a mixed fluid of the carbon dioxide and the modifier mixed in the mixer 15 is supplied to the analysis flow path 2 as a mobile phase.

The sample injector 8 is an autosampler configured to inject a sample into the analysis flow path 2 through which the mobile phase sent from the mobile phase liquid sender 4 flows. The analysis column 10 is provided at a position farther downstream than the sample injector 8 on the analysis flow path 2. The analysis column 10 is used to separate a sample injected by the sample injector 8. The detector 12 is provided at a position farther downstream than the analysis column 10 on the analysis flow path 2. The components of a sample separated in the analysis column 10 are introduced into the detector 12 to be detected. The back pressure controller 14 is provided at the downstream end of the analysis flow path 2, and is configured to adjust the pressure in the analysis flow path 2 to a predetermined pressure.

The masking liquid sender 6 includes a liquid sending pump 22 for sending the masking liquid stored in the masking liquid container 24. The masking liquid sender 6 is configured to supply the masking liquid to the analysis flow path 2 through a masking liquid supply flow path 26 connected to a position farther upstream than the sample injector 8 on the analysis flow path 2. The masking liquid is the liquid that forms a film that suppresses adsorption of a compound such as phosphatidic acid that has absorptivity with respect to metal on the inner surface of the metal pipe constituting the analysis flow path 2. Metal-adsorbing substances include lysophosphatidic acid, phosphatidylserine, adenosine monophosphate, adenosine diphosphate, adenosine triphosphate, fumonisin and the like in addition to phosphatidic acid.

The masking liquid includes methanol including phosphate, for example. Such a masking liquid is sent in the analysis flow path 2 for a certain time (several hours, for example). Thus, a thin film made of a metal salt is formed on the inner surface of the metal pipe constituting the analysis flow path 2, and can cause the inner surface of the analysis flow path 2 to have a function of suppressing adsorption of a metal-adsorbing substance. The processing of sending the masking liquid in the analysis flow path 2 for a certain time and causing the inner surface of the analysis flow path 2 to have a function of suppressing adsorption of a metal-adsorbing substance is referred to as masking processing. A phosphoric acid aqueous solution, a citric acid aqueous solution, ETDA (ethylenediaminetetraacetic acid), acetylacetone or the like can be used as the masking liquid.

The controller 28 controls at least operations of the mobile phase liquid sender 4 and the masking liquid sender 6, and includes a masking-processing step executor 30 and a cleaning step executor 32.

The masking-processing step executor 30 is configured to execute the above-mentioned masking processing in a predetermined period of time in which a sample is not being analyzed. The predetermined period of time in which the masking-processing step is executed is a period of time that is preset by a user such as the period of time between analyses in a series of analyses or the night-time when analysis is not being carried out.

The cleaning step executor 32 sends liquid, other than the masking liquid, such as methanol which is prepared as a modifier in the analysis flow path 2 for a predetermined time to remove the component of the masking liquid such as phosphate remaining in the analysis flow path 2 after the above-mentioned masking-processing step ends.

The controller 28 is realized by a dedicated computer or a general personal computer, and the masking-processing step executor 30 and the cleaning step executor 32 are the functions that are realized when a predetermined program in a computer constituting the controller 28 is executed by an arithmetic element.

Although not shown in FIG. 1, a mass spectrometer may be connected to a position farther downstream than the back pressure controller 14. In that case, a switch valve is provided between the back pressure controller 14 and the mass spectrometer, and is switched such that the masking liquid including non-volatile salt does not flow into the mass spectrometer during the above-mentioned masking processing.

Figure 2:
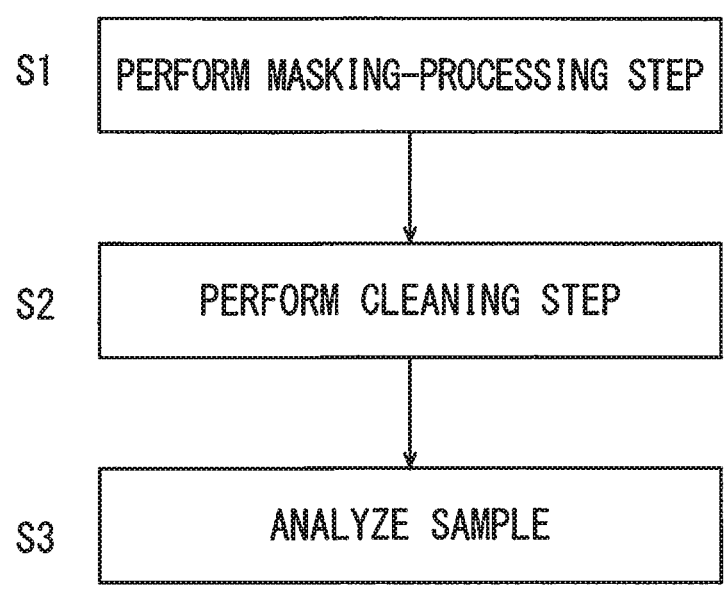
FIG. 2 is a flow chart showing one example of an operation of supercritical fluid chromatography analysis in the same inventive example.

The masking-processing step is executed to enable a sample including a metal-adsorbing substance to be analyzed successfully. Therefore, the masking-processing step is executed in a predetermined period of time before analysis of the sample including a metal-adsorbing substance. That is, in a case where the sample including a metal-adsorbing substance is analyzed, the analysis of the sample is started after the masking-processing step (step S1) and the cleaning step (step S2) are executed as shown in FIG. 2 (step S3).

Once the masking processing is executed, the effect of suppressing the adsorption of the metal-adsorbing substance on the inner surface of the analysis flow path 2 lasts for a certain time. Thus, it is unnecessary to execute the masking-processing step and the cleaning step for every analysis. The masking-processing step and the cleaning step are preferably regularly executed in a predetermined period of time before the effect of the masking processing is lost.

Figure 3A:
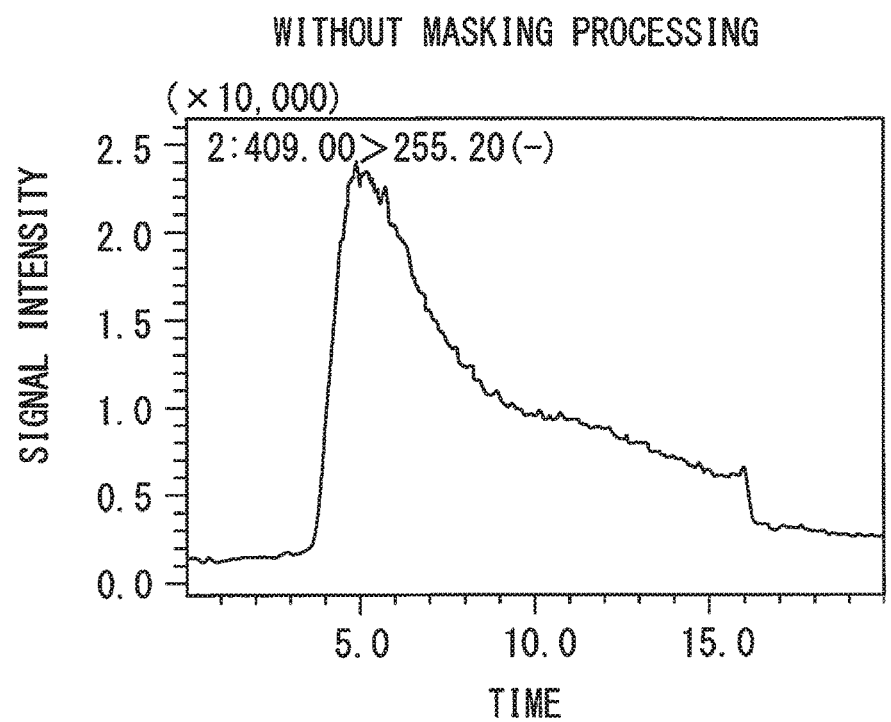
FIG. 3A shows one example of a peak waveform obtained in a case where masking processing is not executed.
Figure 3B:
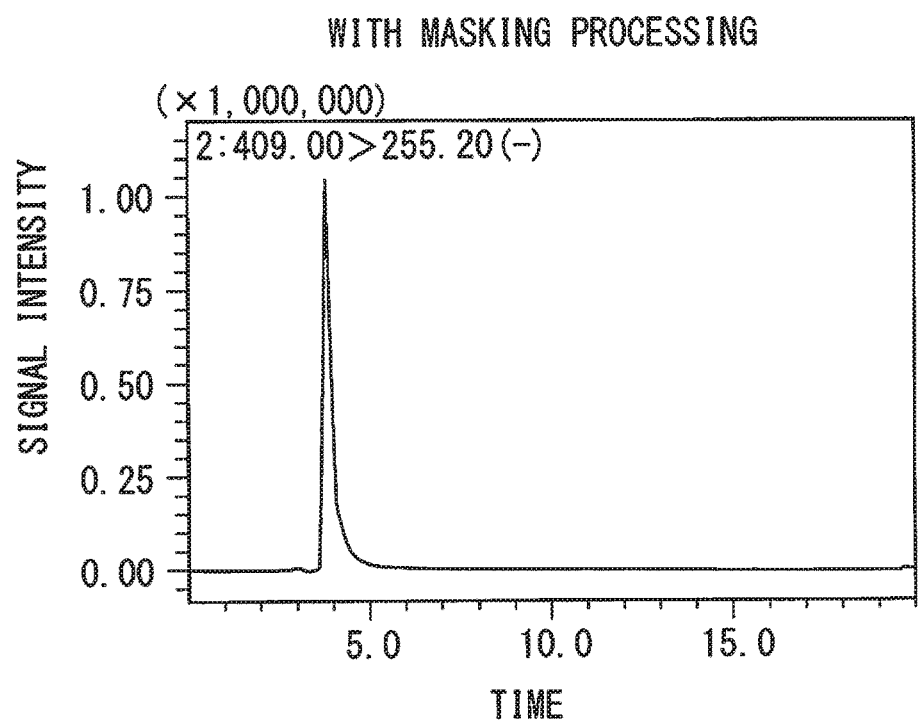
FIG. 3B shows one example of a peak waveform obtained in a case where the masking processing is executed.

FIG. 3A is a peak waveform obtained in a case where lysophosphatidic acid is analyzed with the masking processing not executed on the analysis flow path 2. In a case where no processing is executed on the analysis flow path 2, lysophosphatidic acid having metal-adsorbing property is diffused in the direction of a flow due to the adsorption on the inner surface of the pipe in the analysis flow path 2, and the peak shape becomes broad. This causes separation from other components difficult. In contrast, in a case where the masking processing is executed in the analysis flow path 2 as shown in FIG. 3B, adsorption in the analysis flow path 2 is suppressed, and the peak shape is sharpened. Thus, separation becomes possible. From the above results, it is found that a sample including a metal-adsorbing substance can be analyzed successfully by execution of the masking processing.

DESCRIPTION OF REFERENCE NUMERALS

2 Analysis Flow Path
4 Mobile Phase Sender
6 Masking Liquid Sender
8 Sample Injector
10 Analysis Column
12 Detector
14 Back Pressure Controller
16a, 16b, 22 Pumps
18 Carbon Dioxide Cylinder
20 Modifier Container
24 Masking Liquid Container
26 Masking Liquid Supply Flow Path
28 Controller
30 Masking-Processing Step Executor
32 Cleaning Step Executor

The invention claimed is:

1. A supercritical fluid chromatograph comprising:
an analysis flow path;
a mobile phase liquid sender for sending a mobile phase in the analysis flow path;
a masking liquid sender for sending a masking liquid, that forms a film suppressing adsorption of a metal-adsorbing substance on an inner surface of a metal pipe constituting the analysis flow path, in the analysis flow path;
a sample injector for injecting a sample into the analysis flow path;
an analysis column that is provided on the analysis flow path and separates a sample that is injected into the analysis flow path by the sample injector;
a back pressure adjustor that is provided at a downstream end of the analysis flow path and adjusts a pressure in the analysis flow path; and
a masking-processing step executor configured to execute a masking-processing step of sending the masking liquid in the analysis flow path for a predetermined time using the masking liquid sender in a predetermined period of time in which analysis is not being carried out, and causing the inner surface of the metal pipe constituting the analysis flow path to have a function of suppressing adsorption of a metal-adsorbing substance.

2. The supercritical fluid chromatograph according to claim 1, further comprising a cleaning step executor configured to execute a cleaning step of sending liquid other than the masking liquid in the analysis flow path for a predetermined time after the masking-processing step ends, and removing the masking liquid in the analysis flow path.

3. The supercritical fluid chromatograph according to claim 1, wherein
the masking liquid is methanol including phosphate, a phosphoric acid aqueous solution, a citric acid aqueous solution, ETDA (ethylenediaminetetraacetic acid) or acetylacetone.

4. The supercritical fluid chromatograph according to claim 1, wherein
the masking liquid sender sends the masking liquid, that forms a film suppressing adsorption of phosphatidic acid, lysophosphatidic acid, phosphatidylserine, adenosine monophosphate, adenosine diphosphate, adenosine triphosphate or fumonisin, in the analysis flow path.

5. A supercritical fluid chromatography analysis method of sending a mobile phase including carbon dioxide in an analysis flow path having an analysis column for separating a sample, adjusting a pressure in the analysis flow path to a predetermined pressure using a back pressure adjustor and injecting the sample into the analysis flow path to carry out separation analysis of the sample, comprising:
a masking-processing step of sending a masking liquid, that forms a film suppressing adsorption of a metal-adsorbing substance on an inner surface of a metal pipe constituting the analysis flow path, in the analysis flow path for a predetermined time; and
an analysis step of sending the mobile phase in the analysis flow path and injecting a sample including a metal-adsorbing substance into the analysis flow path to carry out separation analysis of the sample after the masking-processing step is completed,
wherein the masking-processing step of sending the masking liquid in the analysis flow path for the predetermined time is carried out in a predetermined period of time in which the analysis step is not being carried out, to form the film on the inner surface of the metal pipe suppressing adsorption of the metal-adsorbing substance.

6. The supercritical fluid chromatography analysis method according to claim 5, further comprising a cleaning step of sending liquid other than the masking liquid in the analysis flow path for a predetermined time after the masking-processing step is completed and before the analysis step is started, and removing the masking liquid in the analysis flow path.

7. The supercritical fluid chromatography analysis method according to claim 5, wherein
the masking liquid is methanol including phosphate, a phosphoric acid aqueous solution, a citric acid aqueous solution, ETDA (ethylenediaminetetraacetic acid) or acetylacetone.

8. The supercritical fluid chromatography analysis method according to claim 5, wherein
the masking-process step includes sending the masking liquid, that forms a film suppressing adsorption of phosphatidic acid, lysophosphatidic acid, phosphatidylserine, adenosine monophosphate, adenosine diphosphate, adenosine triphosphate or fumonisin, in the analysis flow path.

\* \* \* \* \*